May 24, 1938.  H. S. JANDUS ET AL  2,118,606
TIRE COVER LOCK
Original Filed Sept. 28, 1933   2 Sheets-Sheet 1
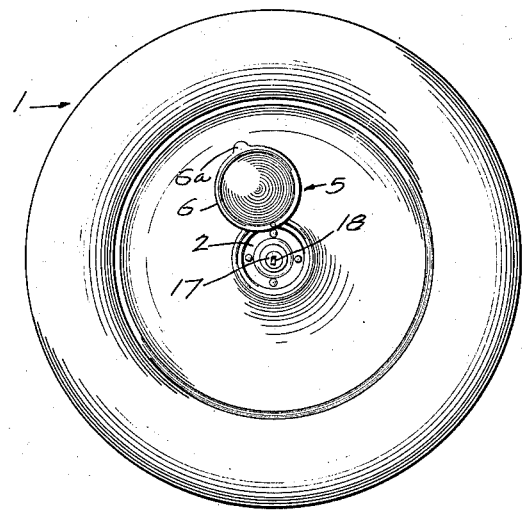
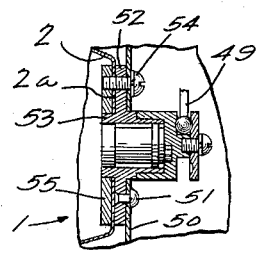
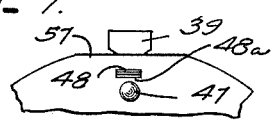
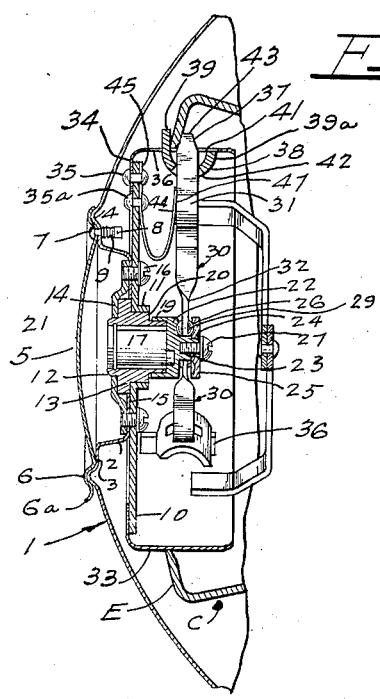
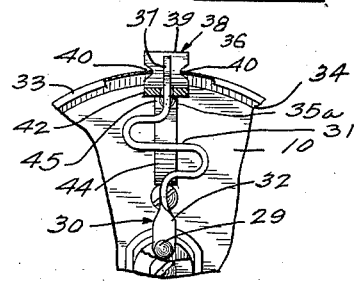
Inventors
HERBERT S. JANDUS,
BLADEN M. SHORT.

May 24, 1938.  H. S. JANDUS ET AL  2,118,606
TIRE COVER LOCK
Original Filed Sept. 28, 1933  2 Sheets-Sheet 2
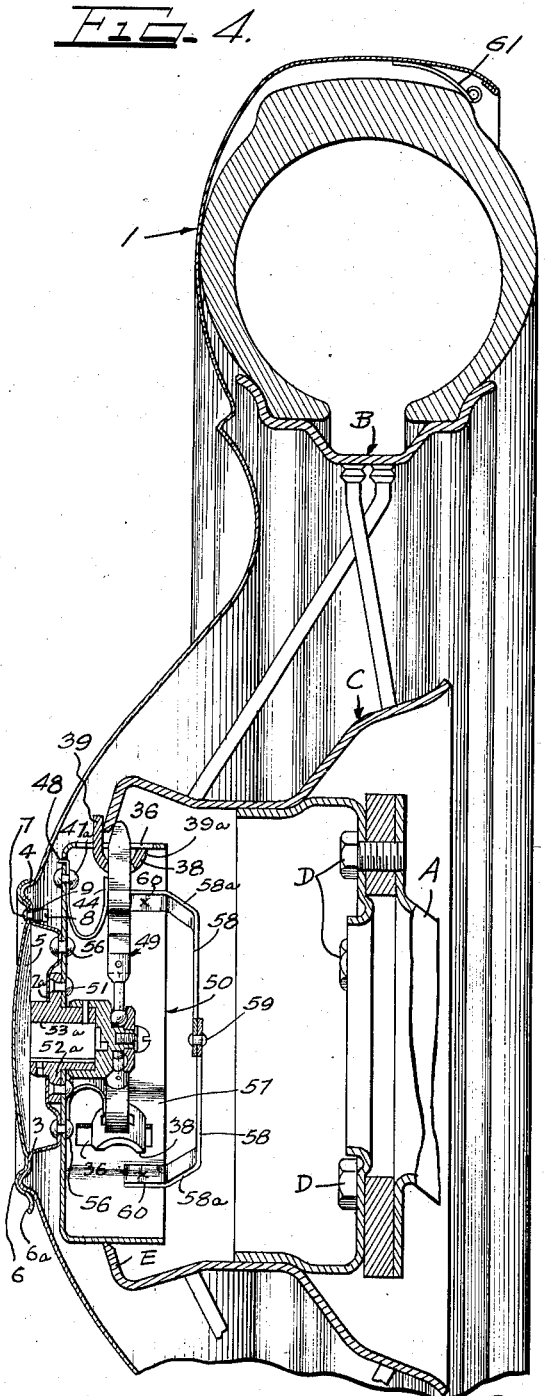
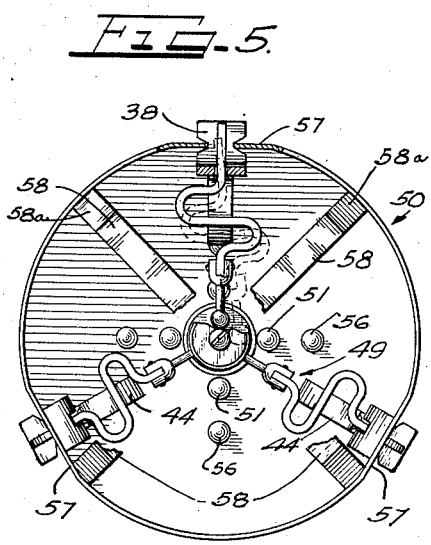
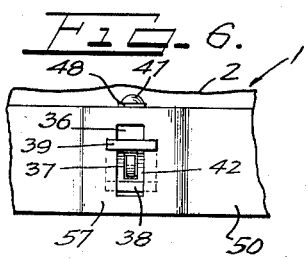
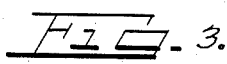
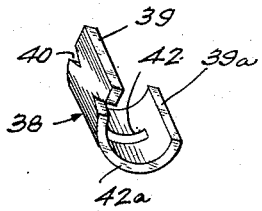
Inventors
HERBERT S. JANDUS,
BLADEN M. SHORT.
by Charles M. Hill Attys.

Patented May 24, 1938

2,118,606

UNITED STATES PATENT OFFICE 2,118,606

TIRE COVER LOCK

Herbert S. Jandus and Bladen M. Short, Detroit, Mich., assignors, by mesne assignments, to Houdaille-Hershey Corporation, Detroit, Mich., a corporation of Michigan Application September 28, 1933, Serial No. 691,294
Renewed February 19, 1937

10 Claims. (Cl. 70—168)

This invention has to do with tire covers and is concerned more particularly with means for locking a tire cover in proper tire protecting position.

It is an object of the invention to provide a tire cover with locking instrumentalities arranged to cooperate with the hub of a wheel on which the tire is mounted to releasably lock the cover to the hub.

It is another object of the invention to provide a tire cover with locking means affording a closure for the front end of a hub to prevent an unauthorized person from gaining access to the bolts or other means by which the hub is mounted upon the spare wheel and tire carrier.

It is a further object of the invention to provide an improved locking means for cooperation with the hub of a spare wheel to operate readily and effectively to lock a cover to the hub, and be readily releasable to enable the cover to be removed from the tire.

It is a further object of the invention to provide a member which combines the function of enclosing a lock housing with the function of guarding the locking elements cooperating bodily with the spare wheel hub to hold the elements in locked position.

It is a further object of the invention to provide, in a tire cover structure, locking means including substantially radially movable spring elements controlled by a key or other theft-defying means.

In accordance with the general features of the invention, a tire cover which may be formed to cover a side wall or to cover side wall and tread portions of a spare tire and to conceal the outer side of a spare wheel is arranged to receive and have secured thereto a locking mechanism constituting an important feature of the invention. Such locking mechanism includes a lock housing preferably mounted centrally of the cover and including spring plungers or latch pins arranged to be positioned within and beyond the rim of the front side of the hub and engaged therewith to lock the cover in position, or to be retracted to enable the cover to be removed. Provision is made to enable the cover to be effectively locked to the hub at different distances therefrom, so that the same cover may be employed to accommodate tires of different widths mounted on the same nominal wheel size, as well as to prevent rattling between the cover and the wheel and tire after the cover is mounted in proper tire protecting position.

Centering means associated with the lock instrumentalities enable the cover to be properly centered and the locking instrumentalities to be guided into cooperative relation with the wheel hub.

The construction is extremely simple and effective, and involves a minimum of parts which are readily manufactured and assembled at low cost. The cover as a whole has the general form of the exposed side of the spare wheel and tire and, if desired, may be provided with a central plate simulating the appearance of the hub cap employed on the wheels supporting the car, thereby harmonizing therewith and enhancing the appearance of the vehicle as a whole.

The cover structure is largely preferably made of sheet metal, the lock instrumentalities requiring little or no machining, and substantially all of the parts may be manufactured by simple stamping or like operations.

Other important objects and advantages of the invention will appear as the description proceeds.

This invention (in preferred forms) is illustrated in the drawings and hereinafter more fully described.

Figure 1 is a fragmentary longitudinal sectional view showing one form of the invention.

Figure 2 is a fragmentary rear elevational view of a part of the mechanism shown in Figure 1.

Figure 3 is an enlarged perspective view of a guide element forming part of the mechanism shown in Figures 1 and 2.

Figure 4 is an enlarged fragmentary longitudinal sectional view of another form of the invention.

Figure 5 is a rear elevational view, partly broken away to show details, of the locking mechanism of Figure 4.

Figure 6 is a fragmentary plan view of a part of the mechanism shown in Figure 5.

Figure 7 is a fragmentary front elevational view of part of the mechanism shown in Figure 4.

Figure 8 is an elevational view of the front of the structure shown in Figure 4, with the closure plate swung to open position.

Figure 9 is a fragmentary view, partly in section and partly in elevation, showing a modified form of connection between parts of the mechanism.

Referring now more particularly to the drawings, a tire carrier shown fragmentarily at A and permanently secured in a conventional manner to an automobile body either at the sides or at the rear or elsewhere as desired is shown supporting a spare wheel B through its hub C with the supporting bolts D accessible through the front wall E of the hub.

The invention is particularly concerned with a cover or guard construction embodying mechanism whereby the same may be releasably locked to the hub C. The tire cover 1 which is chosen here for illustrative purposes only is of the disc or drum type formed to substantially conceal the outer side of the spare wheel and the tire and shaped to conform generally with said sides to substantially simulate the exposed contour thereof. The central portion of the cover is accordingly bulged in front to be disposed in front of the wheel hub. The bulged portion of the cover is formed on its forward side with a preferably circular depression 2 providing a ledge 3 surrounded by a rib 4. A part-spherical plate 5 is formed with a peripheral lip 6 arranged to conceal the depression 2 and to fit the rib 4, said plate being preferably of such a shape and design as to simulate that of the hub caps of the vehicle supporting wheels, for the sake of harmony of appearance. The curvature of the plate 5 is also preferably substantially the same as that of the bulged portion of the cover member 1 so as to constitute a substantial continuation thereof. A pin 7 passes through the marginal portion of the plate 5 and the ledge 3 and is formed rearwardly thereof with an abutment 8 between which and the ledge 3 a spring 9 is located under compression. The plate 5 conceals the front side of the locking instrumentalities to be hereinafter described, and the lip 6 thereof opposite the pin 7 may be grasped at 6a and the plate swung into revealing position against the action of the spring 9 whenever access to the locking instrumentalities is desired.

The locking mechanism includes a base 10 which, in the form of the invention shown in Figure 1, includes a substantially centrally located sleeve or flange 11 which is preferably non-circular and surrounds a similarly non-circular bushing 12. The bushing 12 preferably is provided with a flange or collar 13 arranged to abut the forward face of the base 10. A retaining ring 14 is arranged to surround the forwardly protruding end of the bushing 12 so as to sandwich the collar 13 between the same and the base 10. The depressed portion of the cover member 1 has its bottom 15 provided with a central opening to accommodate the collar 13 and, when the locking mechanism is secured to the cover member 1, said bottom 15 is positioned between the retaining ring 14 and the base 10 and securely sandwiched therebetween by means of fastening instrumentalities such as screws 16.

While the operating mechanism may be controlled either by key or by a safe combination, a key-controlled mechanism is shown on the drawings. This mechanism may be of any desired tumbler or other character and is shown generally at 17 rotatably, but not axially movably, secured within the bushing 12 as is conventional in locks of this character, and has a key hole at 18 accessible when the plate 5 is swung to a revealing position as hereinabove described. The rotary element 17 of the locking mechanism is provided with a cap 19 which is disposed at its foremost end and is formed to shroud the rearwardly projecting part of the bushing 12 and to substantially abut the rear shoulder 20 thereof. The cylinder 17 may be locked against the bushing 12 by any suitable means such as the split ring means shown at 21.

The number of latch pins to be employed for locking the cover structure to the hub C may be varied as desired, three being herein disclosed for illustrative purposes only. To pivotally accommodate the latch pins, the cap 19 is formed with a circular series of spherical depressions 22 arranged preferably 120° apart, and centrally of said series is provided with a rearwardly extending stem 23 which is reduced at 24 to abuttingly accommodate a retainer plate 25. The plate 25 is preferably formed either with a circular groove having the same pitch diameter and transverse curvature as the depressions 22, or with a like series of depressions, as desired. The plate 25 is preferably non-rotatable about the reduced portion 24 of the stem 23, and is held in position by a suitable fastening means such as a screw 27 and associated washer. The retainer plate 25 is spaced from the cap 19 to such an extent that its groove 26 lies transversely in a great circular plane of each depression 22, passing through the axis of the cap 19, so as to accommodate the spherical head 29 at the inner end of each of the latch pins 30.

Each of the latch pins 30 is made preferably of spring strip metal such as spring steel and is formed so as to yield radially. To this end, each latch pin 30 has its intermediate portion 31 formed into an S-shape and has its end portions extending substantially radially when assembled with the locking mechanism, the bulges of the intermediate portions extending on opposite sides of the line connecting the end portions of the pin. The flat sides of the pin extend generally parallel to the axis of the lock means, the inner end of each pin 30, however, being turned at right angles so as to fit with its spherical knobs 29 between the cap 19 and retainer plate 25, the turned end portion 32 being substantially narrower than the distance between the cap 19 and plate 25 so as to enable the pin 30 to pivot forwardly and rearwardly throughout a substantial angle relative to the cap 19 and plate 25. The purpose of this construction will appear as the description proceeds.

A centering collar 33 is formed of such an outside diameter as to closely approximate the diameter of the opening in the front wall E of the hub C so as to readily fit thereinto, and is formed forwardly with an inwardly extending flange 34 which is riveted or spot-welded to the forward face of the base 10 as at 35. The centering collar 33 is provided with three slots 36 extending substantially parallel to the axis of the collar and through which the outer end 37 of each latch pin 30 is to extend when in locking position.

In order to guide each pin in its radial as well as its trans-radial movement, a guide element 38 for each pin 30 is provided. Each element 38 is preferably a substantially J-shaped member whose longer leg 39 is provided with opposed notches 40 arranged so as to slidably accommodate the opposed side edges 41 of the slot 36 in the centering collar 33. The notches 40 are arranged at substantially the same level as the free end of the short leg 39a of the element 38, so that when the element 38 is mounted in the slot 36 with the edges of the slot 36 disposed in said notches, the short leg 39a is in substantial engagement with or disposed adjacent the inner surface of the collar 33 at the slot 36 thereof. The element 38 is readily inserted in cooperative relation with the slotted portion of the collar 33 by first turning the same so that the leg 39 extends laterally in substantial parallelism with the slot 36, inserting the leg 39 outwardly into the slot as far as the notches 40, and thereupon rotating the element so that the leg extends transversely to the slot 36 and the notches 40 readily receive the edge portions of the slot 36 as shown.

Each element 38 is provided in its bight 42a with a longitudinally extending slot 42 shaped to conform to the cross-sectional shape of the latch pin 30 at its outer end so as to slidably receive the same. Sufficient clearance between the walls of the slot 42 and the pin 30 is provided to enable the pin to assume, without interference from the element 38, the various positions to which it may be moved by virtue of its pivotal connection at its inner end. The outer extremity of the end 37 of each pin 30 is rounded or tapered at 43 where it engages the front wall E of the hub C when in locked position. This rounding or tapering facilitates the engagement therebetween when the cover is being locked in proper tire and wheel covering position. The slot 42 in the element 38 is arranged with respect to the leg 39 of said element so as to position the outer end 37 of the latch pin rearwardly of the leg 39 sufficiently to enable the leg 39 and outer end 37 of the pin 30 to be located on opposite sides of the wall E of the hub C.

With the above described construction, it will be observed that the pivotal relationship between each latch pin 30 and the centrally located locking instrumentalities is such as to enable the outer end 37 of the pin 30 to be located substantially anywhere along the slot 36, so that, for example, if a tire which is of greater width than that accommodated by the parts arranged as illustrated in the drawings is mounted on the same nominal size wheel to be covered by the same cover structure, such tire will require merely a greater spacing of the cover member 1 from the hub C, and this will be taken care of by simply shifting the latch pins 30 and associated guide elements 38 to positions rearwardly of those shown.

To the end that rattling of the locking instrumentalities relative to the hub C in whatever position said instrumentalities may occupy when locked to the hub C, may be inhibited, spring elements pressing the latch pins 30 rearwardly are provided. Each spring 44 is substantially U-shaped and is secured at one end 45 to the rear face of the base 10 by suitable means such as the rivets 35, 35a, so as to be non-rotatable, its opposite end 47 extending rearwardly in engagement with the forward edge of the pin 30 as shown. The springs 44 are preferably at all times under compression so as to at all times resiliently urge the pins 30 rearwardly, thereby causing said pins to hold the legs 39 of the elements 38 resiliently against the front side of the wall E of the hub C.

It will be appreciated that the springs 44 could be spot-welded in place, or held by any other suitable means from rotating, as in Figure 7 by employing a single rivet 47a and inserting the offset extremity 48 of the spring 44 in a longitudinal slot 48a provided adjacent the rivet 47a for that purpose.

The spherical knobs 29 may be formed in any suitable manner. They may be formed, for example, by a spherical headed rivet which passes through the turned inner end 32 of the latch pin 30 and has its protruding extremity headed over to a spherical form. If desired, the inner extremity of the end 32 may be stamped into a ball shape, either integral with the pin 30, or provided with an extension which is secured to another piece to thereby provide a substantially two-piece locking pin as shown at 49.

If desired, the base and centering collar may be made integral as shown at 50, and attached to the locking cylinder mechanism by rivets 51 passing through the flange 52 of the sleeve 53 and, in Figure 9 by screws 54 passing through the flange 52, bottom 5 of the depression 2 of the cover member 1, and embedded in the retainer ring 55.

This structure may be somewhat modified as shown in Figure 4, wherein the retainer ring above referred to is dispensed with and the bottom 2a of the cover member is separately connected as by rivets 56, spot welding or the like directly to the base of the centering collar 50 and extends over the flange 52a of the bushing 53a so as to conceal the same.

The springs 44 perform the additional function of forcing the latch pins to the bottoms or rearmost ends of the slots in the centering collar at all times so as to take care of an installation where the tire is supported on a tire carrier in a vertical position and where gravity would not place the latch pins in the proper positions to engage the hub of the wheel.

The tire cover itself may be attached to the lock supporting plate or base by spot welding instead of screws or other means. The screw means shown is preferred, however, since it enables the cover to be enameled before the lock assembly is attached thereto. If spot welding were used, it would be necessary to clean off the enameled surface before the spot welding would be effective. It is desirable, of course, to assemble the entire lock unit with the centering collar and associated parts before it is attached to the side plate of the tire cover.

If desired, instead of forming the lock bushing and base sleeve non-circular to prevent rotation of the bushing, the latter could be provided with a lug to fit in a corresponding keyway in the base 10 or other part secured thereto.

The centering collar shown in Figure 1 may be rolled sheet metal strip formed into substantially a circle. It may be found desirable to insure the outer ends 37 of the latch pins 30 and 49 from being withdrawn entirely inward from the slots 36. To this end, the centering collar may be flattened at 57 at their slotted portions 36 as shown in Figures 4, 5, 6 and 7. This does not interfere with the proper fit of the centering collar within the hub C, yet it brings the slotted portions radially inward sufficiently to enable the outer ends of the latch pins to be drawn radially inwardly sufficiently to clear the mouth of the front wall E of the hub C and yet retain said outer ends of the latch pins within the slots 36.

The locking instrumentalities above described are extremely simple, involving parts which are inexpensively made. The locking mechanism may be such as to be operated by key, although it will be understood that, if desired, a mechanism such as a safe combination may be employed. A mere partial turn of the locking cylinder by employing the proper key will retract or project the latch pins out of and into cooperative relation with the hub C. The outer periphery of the tire will serve as centering means cooperating with the outer periphery of the cover to enable a person to readily position the centering collar within the front opening of the hub D. To facilitate such centering, if desired, the rear part of the centering collar may be substantially frusto-conical so as to cooperate with the mouth of the front wall E of the hub C in readily positioning the centering collar in the hub. This may be effected by securing a pair of crossed straps 58 together at their place of contact substantially axially of the collar at 59 and to the collar at 60 as by rivets, spot-welding or the like. Said straps are bent adjacent their ends and inclined at 58a so as to engage the rim of the opening in the hub wall E and thereby facilitate positioning of the centering collar in proper cooperative relation to the hub.

Due to the pressure of the springs 44 upon the latch pins and guide elements 38, the legs 39 will engage the front of the hub substantially as soon as the centering collar is positioned therein. The latch pins may then be projected outwardly to interlock with the wall E. Some holding means such as a circumferential series of springs, of which one is shown at 61, will be employed in conjunction with the tire cover to hold the same adjacent the front wall of the spare tire, so that springs 44 will resiliently prevent any rattling whatever and at the same time are yieldable to enable the cover to cooperate with tires of different widths.

The spare tire may be mounted on the carrier at the rear, at the side in conjunction with or separate from a well such as a fenderwell, or at any other suitable part of the vehicle body. The mounting bolts D are located so as to be accessible only from the front of the hub C. Accordingly, when the tire cover is locked to the hub as shown, it serves to substantially close the opening at the front of the hub and thereby prevents unauthorized access to the mounting bolts or nuts D, thereby locking the spare wheel and tire also.

If desired, the latches may be of non-resilient material and may be made straight instead of bent and resilient. They are preferably resilient, however, and the locking mechanism is arranged so as to project the outer ends of the latches into engagement with the wall E of the hub to such an extent that the latches will resiliently engage said wall. Thus the latches will inhibit rattling between the same and the associated structure and will compensate for the slight differences in dimensions which generally creep in in manufacturing hubs and the like. If desired, the free ends of the springs 44 may be extended through the slots 36 into engagement with the legs 39 of the elements 38 so as to directly urge the legs 39 against the hub wall E.

Moreover, a tongue may be extended from the short leg of the guide element into the slot 36 so as to assist in preventing loss of the element and assist the element in sliding in the slot.

We are aware that many changes may be made and numerous details of construction may be varied through a wide range without departing from the principles of this invention, and we, therefore do not purpose limiting the patent granted hereon otherwise than necessitated by the prior art.

We claim as our invention:

1. A lock comprising, a substantially cup-shaped member having its outer wall of a diameter such as to readily slide into an opening for locking engagement with the walls thereof, lock mechanism associated with the base of said member, lock means universally carried by said mechanism so as to be moved substantially radially into and out of interlocked relation and to shift in the general direction of the axis of said member to enable the locking means to assume different locking positions transversely of said member, said outer wall of said member being provided with slot means through which the lock means projects when in locked position, guide means slidable in said slot means and operatively associated with said lock means so as to guide the latter in its trans-radial movement.

2. A lock comprising, a substantially cup-shaped member having its outer wall of a diameter such as to readily slide into an opening for locking engagement with the walls thereof, lock mechanism associated with the base of said member, lock means universally carried by said mechanism so as to be moved substantially radially into and out of interlocked relation and to shift in the general direction of the axis of said member to enable the locking means to assume different locking positions transversely of said member, said outer wall of said member being provided with slot means through which the lock means projects when in locked position, guide means slidable in said slot means and operatively associated with said lock means so as to guide the latter in its trans-radial movement, and resilient means constantly urging said lock means rearwardly.

3. A lock comprising, a substantially cup-shaped member having its outer wall of a diameter such as to readily slide into an opening for locking engagement with the walls thereof, lock mechanism associated with the base of said member, lock means universally carried by said mechanism so as to be moved substantially radially into and out of interlocked relation and to shift in the general direction of the axis of said member to enable the locking means to assume different locking positions transversely of said member, said outer wall of said member being provided with slot means through which the lock means projects when in locked position, guide means slidable in said slot means and operatively associated with said lock means so as to guide the latter in its trans-radial movement, said guide means projecting outwardly beyond said member so as to adapt it to engage the front surface of the walls of the opening when the cup member is projected into the opening, and so as to cooperate with said latch means in straddling the wall of the opening to effectively interlock therewith.

4. A lock comprising, a substantially cup-shaped member having its outer wall of a diameter such as to readily slide into an opening for locking engagement with the walls thereof, lock mechanism associated with the base of said member, lock means universally carried by said mechanism so as to be moved substantially radially into and out of interlocked relation and to shift in the general direction of the axis of said member to enable the locking means to assume different locking positions transversely of said member, said outer wall of said member being provided with slot means through which the lock means projects when in locked position, guide means slidable in said slot means and operatively associated with said lock means so as to guide the latter in its trans-radial movement, said guide means projecting outwardly beyond said member so as to adapt it to engage the front surface of the walls of the opening when the cup member is projected into the hub, and so as to cooperate with said latch means in straddling the wall of the opening to effectively interlock therewith, and resilient means constantly urging said guide means into engagement with the walls of the opening.

5. In a spare wheel and tire cover assembly including a tire cover lock structure for cooperation with a wheel hub to lock the cover thereto, a lock mechanism carried by the cover comprising key-controlled latch means arranged to be projected into and retracted from interlocked relation to the hub, and means for enabling said latch means to shift transversely of the cover to enable the cover to accommodate tires of different widths for the same nominal size wheel.

6. In a spare wheel and tire cover assembly including a tire cover lock structure for cooperation with a wheel hub to lock a cover thereto, a lock mechanism carried by the cover comprising key-controlled latch means arranged to be projected into and retracted from interlocked relation to the hub, means for enabling said latch means to shift transversely of the cover to enable the cover to accommodate tires of different widths for the same nominal size wheel, and means for guiding said latch means in its shifting movement.

7. In a spare wheel and tire cover assembly including a tire cover lock structure for cooperation with a wheel hub to lock a cover thereto, a lock mechanism carried by the cover comprising key-controlled latch means arranged to be projected into and retracted from interlocked relation to the hub, means for enabling said latch means to shift transversely of the cover to enable the cover to accommodate tires of different widths for the same nominal size wheel, and means for yieldably spacing the latch means from the cover.

8. In a spare wheel and tire cover assembly including a tire cover lock structure for cooperation with the front of a wheel hub to lock the cover thereto, a lock mechanism carried by the cover comprising key-controlled latch means arranged to be projected into and retracted from interlocked relation to the hub, means for enabling said latch means to shift transversely of the cover to enable the cover to accommodate tires of different widths for the same nominal size wheel, and means for guiding said latch means in its shifting movement, said guiding means being arranged to engage a front wall at the front of the hub and the latch means being engageable with a rear wall at the front of the hub so as to interlock with the hub.

9. In a spare wheel and tire cover assembly including a tire cover lock structure for cooperating with a wheel hub to lock the cover thereto, a lock mechanism carried by the cover comprising key-controlled lock means arranged to be projected into and retracted from interlocked relation to the hub, a centering collar associated with said mechanism and being of such dimensions as to substantially slidably fit in the hub and formed with means for guiding said latch means, said collar being depressed adjacent its guide means so as to accommodate said latch means after the same is retracted.

10. In a wheel assembly including a central element and a side cover plate, a lock mechanism comprising latch means secured to and arranged substantially centrally of the plate, means to radially project said latch means, and a universal connection between said latch means and said projecting means to enable said means to be moved substantially radially into and out of locking engagement with said element and also transversely to adjust for variations in the transverse position of said plate with respect to said central element.

HERBERT S. JANDUS.
BLADEN M. SHORT.